(12) United States Patent
Kadowaki

(10) Patent No.: US 7,512,281 B2
(45) Date of Patent: Mar. 31, 2009

(54) IMAGE PROCESSING APPARATUS THAT CAN GENERATE CODED DATA APPLICABLE TO PROGRESSIVE REPRODUCTION

(75) Inventor: Yukio Kadowaki, Nara (JP)

(73) Assignee: Ricoh Company, Ltd., Tokyo (JP)

( * ) Notice: Subject to any disclaimer, the term of this patent is extended or adjusted under 35 U.S.C. 154(b) by 938 days.

(21) Appl. No.: 10/953,758

(22) Filed: Sep. 29, 2004

(65) Prior Publication Data

US 2005/0084169 A1    Apr. 21, 2005

(30) Foreign Application Priority Data

Sep. 30, 2003   (JP) ............................. 2003-340057

(51) Int. Cl.
*G06K 9/36* (2006.01)
*G06K 9/46* (2006.01)

(52) U.S. Cl. .................. 382/240; 382/239; 382/232

(58) Field of Classification Search ........................ None
See application file for complete search history.

(56) References Cited

U.S. PATENT DOCUMENTS

| 4,958,311 | A | 9/1990 | Kadowaki et al. |
| 5,048,179 | A | 9/1991 | Shindo et al. |
| 5,252,917 | A | 10/1993 | Kadowaki |
| 5,517,108 | A | 5/1996 | Kadowaki |
| 5,611,021 | A | 3/1997 | Kadowaki et al. |
| 5,680,516 | A | 10/1997 | Kadowaki et al. |
| 5,742,801 | A | 4/1998 | Fukushima et al. |
| 5,794,067 | A | 8/1998 | Kadowaki |
| 5,918,253 | A | 6/1999 | Kadowaki |
| 6,066,978 | A | 5/2000 | Kadowaki |
| 6,668,090 | B1* | 12/2003 | Joshi et al. .................. 382/239 |
| 6,778,709 | B1* | 8/2004 | Taubman .................... 382/240 |
| 6,879,727 | B2* | 4/2005 | Sato et al. .................. 382/239 |
| 6,987,890 | B2* | 1/2006 | Joshi et al. .................. 382/240 |
| 7,110,608 | B2* | 9/2006 | Chan et al. .................. 382/239 |
| 7,127,111 | B2* | 10/2006 | Fukuhara et al. ........... 382/232 |
| 2003/0152280 | A1 | 8/2003 | Kadowaki et al. |
| 2004/0131265 | A1 | 7/2004 | Yagishita et al. |
| 2004/0136596 | A1 | 7/2004 | Oneda et al. |
| 2004/0136599 | A1 | 7/2004 | Kadowaki |
| 2004/0146209 | A1 | 7/2004 | Kadowaki et al. |
| 2004/0151385 | A1 | 8/2004 | Oneda et al. |
| 2004/0163038 | A1 | 8/2004 | Yano et al. |

FOREIGN PATENT DOCUMENTS

| JP | 2000-201353 | 7/2000 |
| JP | 2003101787 | 4/2003 |
| JP | 2005101862 | 4/2005 |
| JP | 2005110185 | 4/2005 |

OTHER PUBLICATIONS

Annex F.1.2, ISO/IEC JTC 1/SC 29/WG 1 N1646, JPEG 2000 Part I final committee draft Version 1.0, Mar. 16, 2000.*

* cited by examiner

*Primary Examiner*—Matthew C Bella
*Assistant Examiner*—Yuzhen Ge
(74) *Attorney, Agent, or Firm*—Cooper & Dunham, LLP.

(57) ABSTRACT

An image processing apparatus divides data related to an image into bit-planes and performs a coding process on data of each of the bit-planes. The image processing apparatus includes a multi-layer generation part that divides codes obtained by the coding process into a plurality of layers sequentially from the codes corresponding to higher bit-planes such that the amount of the codes of each of the layers is equal to or less than a predetermined value. A code generation part generates coded data in units of the codes divided into the layers by the multi-layer generation part.

21 Claims, 14 Drawing Sheets

FIG.1

| LAYER NO. | LEVEL 3<br>3LL,3HL,3LH,3HH | LEVEL 2<br>2HL,2LH,2HH | LEVEL 1<br>1HL,1LH,1HH | |
|---|---|---|---|---|
| L1 | CP1 CP1 CP1 CP1<br>CP2 CP2 CP2 CP2 | | | CP |
| L2 | | CP1 CP1 CP1<br>CP2 CP2 CP2<br>CP3 CP3 CP3 | CP1 CP1 | |
| L3 | | | CP2 CP2 CP2 | |
| ⋮ | ⋮ | ⋮ | ⋮ | ⋮ |

FIG.3

| TABLE NO. T | COMPONENT | 3LL, 3HL, 3LH, 3HH, 2HL, 2LH, 2HH, 1HL, 1LH, 1HH |
|---|---|---|
| ⋮ | | ⋮ |
| T=36 | Y | 0, 0, 0, 0, 0, 0, 0, 0, 0, 0 |
|  | Cb | 0, 0, 0, 1, 1, 1, 3, 4, 4, 7 |
|  | Cr | 0, 0, 0, 0, 1, 1, 2, 3, 3, 5 |
| T=37 | Y | 0, 0, 0, 0, 0, 0, 0, 0, 0, 0 |
|  | Cb | 0, 0, 0, 1, 1, 2, 3, 4, 4, 7 |
|  | Cr | 0, 0, 0, 0, 1, 1, 2, 3, 3, 5 |
| T=38 | Y | 0, 0, 0, 0, 0, 0, 0, 0, 0, 0 |
|  | Cb | 0, 0, 0, 1, 2, 2, 3, 4, 4, 7 |
|  | Cr | 0, 0, 0, 0, 1, 1, 2, 3, 3, 5 |
| T=39 | Y | 0, 0, 0, 0, 0, 0, 0, 0, 0, 1 |
|  | Cb | 0, 0, 0, 1, 2, 2, 3, 4, 4, 7 |
|  | Cr | 0, 0, 0, 0, 1, 1, 2, 3, 3, 5 |
| T=40 | Y | 0, 0, 0, 0, 0, 0, 0, 0, 0, 1 |
|  | Cb | 0, 0, 0, 1, 2, 2, 3, 4, 4, 8 |
|  | Cr | 0, 0, 0, 0, 1, 1, 2, 3, 3, 5 |
| ⋮ | | ⋮ |

FIG.5
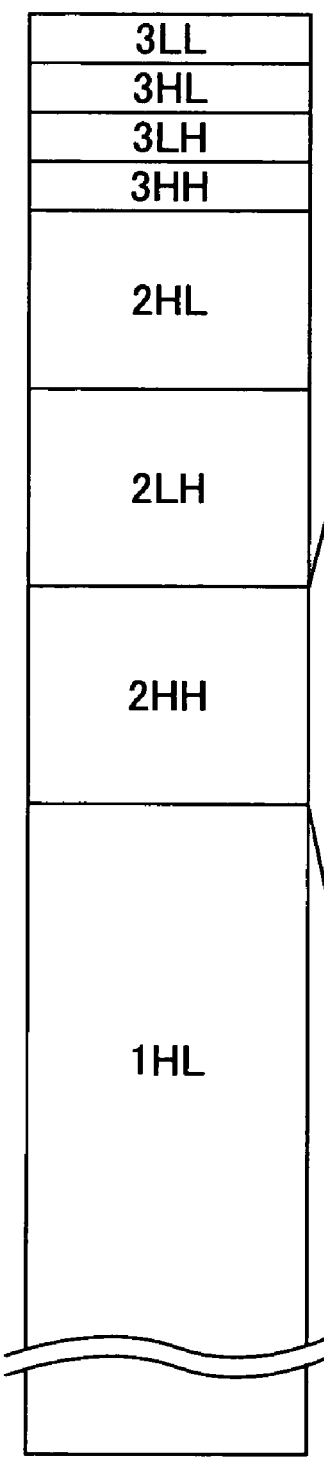
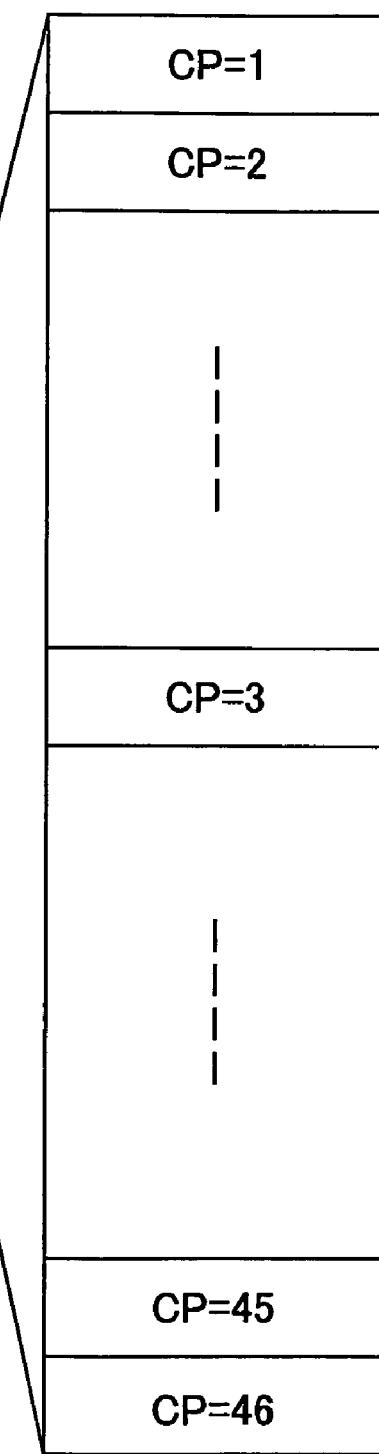

FIG.6

| LAYER 1 | CODING PATH REQUIRED FOR CODE SIZE = M1 |
|---|---|
| LAYER 2 | ADDITIONAL CODING PATH REQUIRED FOR CODE SIZE = M2 |
| LAYER 3 | ADDITIONAL CODING PATH REQUIRED FOR CODE SIZE = M3 |
| ... | ... |
| LAYER 8 | ADDITIONAL CODING PATH REQUIRED FOR CODE SIZE = M8 |

FIG.7

| | | 3LL | 3HL | 3LH | 3HH | 2HL | 2LH | 2HH | 1HL | 1LH | 1HH |
|---|---|---|---|---|---|---|---|---|---|---|---|
| LAYER 1 TABLE NO.40 IS USED | Y | CP1~CP46, | CP1~CP46, | CP1~CP46, | CP1~CP46, | CP1~CP46, | CP1~CP46, | CP1~CP46, | CP1~CP46, | CP1~CP46, | CP1~CP45 |
| | Cb | CP1~CP46, | CP1~CP46, | CP1~CP46, | CP1~CP46, | CP1~CP44, | CP1~CP44, | CP1~CP43, | CP1~CP42, | CP1~CP42, | CP1~CP38 |
| | Cr | CP1~CP46, | CP1~CP46, | CP1~CP46, | CP1~CP46, | CP1~CP46, | CP1~CP45, | CP1~CP44, | CP1~CP43, | CP1~CP43, | CP1~CP41 |
| LAYER 2 TABLE NO.38 IS USED | Y | | | | | | | | | | CP46 |
| | Cb | | | | | | | | | | CP39 |
| | Cr | | | | | | | | | | |
| LAYER 3 TABLE NO.36 IS USED | Y | | | | | | CP45, | CP45, | | | |
| | Cb | | | | | | | | | | |
| | Cr | | | | | | | | | | |
| ..... | | | | | | | | | | | |
| LAYER 8 TABLE NO.* IS USED | Y | | | | | | | | | | |
| | Cb | | | | | | | | | | |
| | Cr | | | | | | | | | | |

IMAGE PROCESSING APPARATUS THAT CAN GENERATE CODED DATA APPLICABLE TO PROGRESSIVE REPRODUCTION

BACKGROUND

1. Technical Field

This disclosure generally relates to image processing apparatuses that perform compression coding of image data and/or coefficient data obtained by performing frequency transform on the image data and, more particularly to an image processing apparatus chat performs compression coding in conformity with JPEG 2000.

2. Description of the Related Art

Recently, JPEG 2000 is known as a compression coding method suitable for handling high-definition images. In the coding process of JPEG 2000, image data are converted into data of each color component, Y, Cb and Cr, and thereafter a two-dimensional discrete wavelet transform is performed on each data for frequency analysis.

Wavelet coefficient data (e.g., 16-bit data) obtained by the wavelet transform are divided into bit-planes in units of subbands (e.g., in the case of a wavelet transform at a level 3, 3LL, 3HL, 3LH, 3HH, 2HL, 2LH, 2HH, 1HL, 1LH and 1HH), and the data of each bit-plane are scanned sequentially from the top in three ways for each subband, thereby performing an arithmetic coding process. The three ways are called a "significant propagation pass", a "magnitude refinement pass" and a "cleanup pass".

In the case of 16-bit data, for example, 15×3+1=46 coding paths are formed by the above-mentioned arithmetic coding process. Hereinafter, for convenience of explanation, the coding paths are referred to as CP1 through CP46 in such a manner that a coding path corresponding to a higher bit-plane is indicated by a lower number. Final coded data are formed by adding, for example, required header information to MQ codes obtained by the above-mentioned arithmetic coding process.

JPEG 2000 implements the concept of multi-layer. As shown in FIG. 1, for example, in multi layers, a layer 1 (L1) includes: MQ codes obtained from the top two coding paths CP1 and CP2 of each subband (3LL, 3HL, 3LH and 3HH) of a level 3; and a MQ code obtained from the top coding path CP1 of a subband (1HH) of the level 1. These data are handled as packet data 1. A layer 2 (L2) includes: MQ codes obtained from top three coding paths CP1, CP2 and CP3 of each subband (2HL, 2LH and 2HH) at a level 2; and a MQ code obtained from the top coding path CP1 of each subband (1HL and 1LH) at the level 1. These data are handled as packet data 2. Similarly, the data of the remaining coding paths of each subband are divided into plural layers, and the data of each layer are handled as one packet data.

In JPEG 2000, it is possible to freely define how to divide each code block of each subband into layers (on what basis grouping is to be performed).

It is possible to perform a so-called progressive reproduction process in which an image is gradually reproduced by using the above-mentioned multiple layers and sequentially decoding the data of the coding paths included in the layer 1, the layer 2 and the layer 3 . . . in this order. There are image processing apparatuses that perform the progressive reproduction process by using multiple layers of JPEG 2000.

As for progressive display of multiple layers using JPEG 2000, a detailed description is given in "ISO/IEC 15444, JPEG 2000".

As mentioned above, with the use of multiple layers of JPEG 2000, it is possible to realize progressive reproduction. However, the amount of MQ codes (MQ code amount) of each coding path obtained by an arithmetic coding process is not constant. Hence, even if the number of coding paths to be taken in each layer is made constant, the amount of codes of each layer becomes unstable, which is inconvenient in transferring data and/or storing data in memory.

SUMMARY

In an aspect of this disclosure, an image processing apparatus is provided which is capable of forming coded data that are formed by multiple layers in which the amount of MQ codes (MQ code amount) of each layer falls within a specified range so as in improve convenience in transferring data and are applicable to a progressive reproduction process of high image quality.

In another aspect of this disclosure, there is provided an image processing apparatus that divides data related to an image into bit-planes and performs a coding process on data of each of the bit-planes, the image processing apparatus including:

a multi-layer generation part that divides codes obtained by the coding process into a plurality of layers sequentially from the codes corresponding to higher bit-planes such that an amount of the codes of each of the layers is equal to or less than a predetermined value; and a code generation part that generates coded data in units of the codes divided into the respective layers by the multi-layer generation part.

According to the above-mentioned aspect it is possible to generate coded data that are formed by multiple layers. In the coded data, the MQ code amount of each of the layers falls, within a predetermined range, and thus convenience in transferring data is improved. The coded data are also applicable to a progressive reproduction process of high image quality.

Additionally, in an exemplary embodiment of this Disclosure, the image processing apparatus may perform the coding process on data related to an image divided into a plurality of blocks, the image processing apparatus may further comprise a truncation table including truncation data that determine the codes to be discarded sequentially from the codes corresponding to lower bit-planes for each of the blocks, and the truncation data are arranged such that the amount of the codes to be discarded is increased or decreased with an increase in a table number and quality of a reproduced image is gradually degraded or improved, based on the truncation table, the multi-layer generation part may specify for a top layer the truncation data of a table number with which the quality of the reproduced image is maximized, and specify for subsequent layers the truncation data of table numbers such that a difference between a code amount of one of the subsequent layers and a code amount after discarding based on the truncation data specified for a preceding layer is a predetermined value or less and the quality of the reproduced image is maximized, and the code generation part may specify codes of each of the layers based on the truncation data of the table number specified by the multi-layer generation part, and generate coded data in units of the codes of each of the layers.

Accordingly, by further using the truncation table, it is possible to control the code amount of each layer to be the predetermined value or less and improve the quality of a reproduced image.

In an exemplary embodiment of this disclosure, the data related to an image may be coefficient data obtained by performing frequency analysis on image data.

Accordingly, when coding the coefficient data obtained by performing frequency analysis on image data into coded data, by setting the code amount of each layer to be the predetermined value or less, it is possible to enhance convenience in, for example, transferring data of the codes of each layer and/or decoding the coded data.

In an exemplary embodiment of this disclosure, in any of the above-mentioned image processing apparatuses, a two-dimensional discrete wavelet transform may be performed as the frequency analysis on the image data in accordance with JPEG 2000, wavelet coefficients obtained by the transform may be divided into bit-planes, and an arithmetic coding process may be performed on data of each of the bit-planes, and the multi-layer generation part may divide the codes of coding paths obtained by the coding process into a plurality of layers sequentially from the coding paths corresponding to higher bit-planes such that the code amount of each of the layers is a predetermined value or less.

Accordingly, when coding into coded data the wavelet coefficients obtained by performing the two-dimensional discrete wavelet transform on the image data according to JPEG 2000, by setting the code amount of each layer to be the predetermined value of less, it is possible to enhance convenience in, for example, transferring data of the codes of each layer and/or decoding the coded data.

In an exemplary embodiment of this disclosure, any of the above-mentioned image processing apparatuses may further include:

a storing part that stores codes obtained by the coding process;

wherein the code generation part may generate coded data by reading from the storing part the codes divided into the respective layers by the multi-layer generation part.

Accordingly, when generating coded data, by using the codes stored in the storing part, it becomes unnecessary to repeatedly perform the coding process on image data. Thus, it is possible to speed up the process.

In an exemplary embodiment of this disclosure, any of the above-mentioned image processing apparatuses may further include:

a setting part that sets the number of the layers from a top to be used in accordance with a specified code amount;

wherein the code generation part may generate coded data structured only by the number of the layers set by the setting part.

Accordingly, by specifying the number of layers to be used as coded data in accordance with the specified code amount, it is possible to generate coded data in which codes are divided into layers by the predetermined value.

In an exemplary embodiment of this disclosure, any of the above-mentioned image processing apparatuses may further include:

a predetermined value setting part that sets a predetermined value for a code amount of each of the layers;

wherein the multi-layer generation part may divide the codes obtained by the coding process into a plurality of layers sequentially from the codes corresponding to higher bit-planes such that the code amount of each of the layers is equal to or less than the predetermined value that is set by the predetermined value setting part.

Accordingly, by allowing setting of a predetermined value for the code amount of each layer, it is possible to correspond to a more flexible coding process.

Additionally, according to another aspect of this disclosure, there is provided an image processing method that divides data related to an image into bit-planes and performs a coding process on data of each of the bit-planes, the image processing method including the steps of:

dividing codes obtained by the coding process into a plurality of layers sequentially from the codes corresponding to higher bit-planes such that a code amount of each of the layers is equal to or less than a predetermined value; and generating coded data in units of the codes divided into the respective layers by the step of dividing codes.

Additionally, according to another aspect of this disclosure, there is provided an image processing program realizing, by software processing, all or part of an image processing apparatus that divides data related to an image into bit-planes and performs a coding process on data of each of the bit-planes, the image processing program causing a computer to function at least as:

a multi-layer generation part that divides codes obtained by the coding process into a plurality of layers sequentially from the codes corresponding to higher bit-planes such that a code amount of each of the layers is equal to or less than a predetermined value; and a code generation part that generates coded data in units of the codes divided into the respective layers by the multi-layer generation part.

Other aspects, features and advantages of the present invention will become more apparent from the following derailed description when read in conjunction with the following drawings.

BRIEF DESCRIPTION OF THE DRAWINGS

FIG. 1 is a schematic diagram showing multiple layers formed by a conventional image processing apparatus that conforms to JPEG 2000;

FIG. 3 is a truncation table;

FIG. 5 is a memory map of a code memory;

FIG. 6 is a table showing coding paths to be included in each layer;

FIG. 7 is a table showing coded data of layers 1 through 8;

DETAILED DESCRIPTION OF THE PREFERRED EMBODIMENTS

(1) Embodiment 1

(1-1) Description of Coding Process Using Multiple Layers

Figure 2:
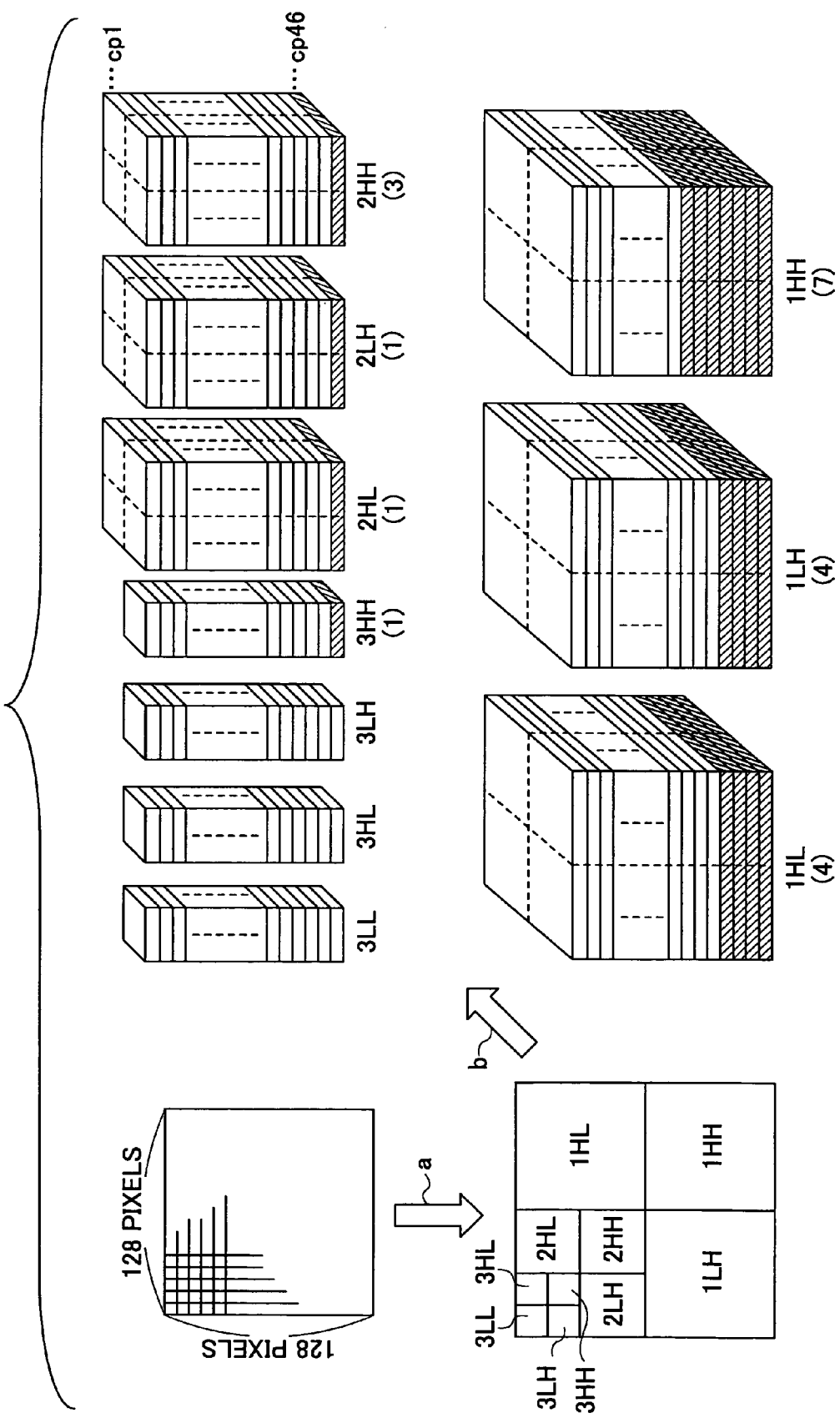
FIG. 2 is a schematic diagram for explaining a coding process performed by an image processing apparatus according to Embodiment 1.

FIG. 2 is a schematic diagram for explaining image processing performed by an image processing apparatus A according to Embodiment 1 of the present invention. First, image data of 128 pixels×128 pixels are subjected to a color conversion process to Y, Cb and Cr. Then, data of each color component are subjected to a two-dimensional discrete wavelet transform (2D-DWT) at level 3 (indicated by an arrow "a" in FIG. 2).

16-bit wavelet coefficients of each subband (3LL, 3HL, 3LH, 3HH, 2HL, 2LH, 2HH, 1HL, 1LH and 1HH) obtained by the 2D-DWT are divided into 16 bit-planes, and the data of each bit-plane of each subband are sequentially scanned from the top in three kinds of methods, thereby performing an arithmetic coding process (indicated by an arrow "b" in FIG. 2). The three kinds of methods are called "significant propagation pass", "magnitude refinement pass", and "cleanup pass". In the case of 16-bit data, for example, by the above-mentioned arithmetic coding process, 15×3+1=46 coding paths are formed. Hereinafter, for convenience of explanation, the coding paths are indicated by CP1 through CP46 in such a manner that a coding path corresponding to a higher bit-plane is indicated by a lower number.

The image processing apparatus A according to Embodiment 1 adopts so-called multiple layers obtained by dividing the coding path for each subband derived from the above-mentioned arithmetic coding process is divided into plural layers. The coding path is divided into layers such that the image quality of a reproduced image becomes best, a layer 1 includes coding paths with which MQ codes generated by the arithmetic coding process amount to a predetermined amount M1, a layer 2 includes coding paths to be added to the layer 1 so that the amount of MQ codes (MQ code amount) becomes M2 (M1<M2), and a layer 3 includes coding paths to be added to the layers 1 and 2 so that the amount of MQ codes becomes M3 (M2<M3). Similarly, the coding paths of each subband are divided into layers 4 through 8 such that the compression rate becomes lower in this order (such that the amount of MQ codes becomes larger in this order).

By setting the amount of MQ codes of each layer to a corresponding one of M1 through M8 (more accurately, the maximum value that does not exceed the corresponding one of M1 through M8), handling at the time of data transfer becomes easy.

Further, as for the layer 2 and the subsequent layers, the increasing amount of MQ codes from M2 to M8 may be constant so as to make the amount of MQ codes of each layer to be constant, it is possible to increase the speed of a data transfer process.

In addition, the difference between M1 and M2 may be set to a value the same as, for example, the difference between M2 and M3.

Additionally, a plurality of register group having the same structure as a register group 7, and a selector that selects one of these may be prepared. The values of M1 through M8 may be suitably varied in accordance with the size (number of pixels) of a manuscript to be subjected to a coding process or the performance of an apparatus that processes coded data output from the image processing apparatus A.

When coded data generated by using multiple layers are decoded in the order of the layer 1, the layer 2, . . . , progressive image reproduction is realized. When forming coded data, by discarding the data of coding paths of a subband having small influence on a reproduced image more than the data of coding paths of a subband having great influence on the reproduced image, it is possible to maintain the quality of the reproduced image.

When specifying the combination of coding paths wherein the MQ code amounts of the layers 1 through 8 become M1 through M8, respectively, the image processing apparatus A uses a truncation table as shown in FIG. 3.

In the truncation table shown in FIG. 3, the number of coding paths to be subjected to data discarding is shown for each subband. Here, data discarding represents replacement of the value of relevant data with 0. As can be appreciated from the truncation table shown in FIG. 3, the larger the value T of a table number is, the number of coding paths to be subjected to data discarding specified for each subband becomes larger.

The setting is employed wherein the data of coding paths of a subband having small influence on a reproduced image are given higher priority in discarding over the data of coding paths of a subband having great influence on the reproduced image. Hence, compared to the case where data of coding paths of each subband are uniformly discarded, even if the coded data are at the same compression rate, it is possible to improve the quality of the reproduced image.

(1-2) Detailed Description of Image Processing Apparatus

Referring to FIGS. 4 through 12, a detailed description is given below of the structure of the image processing apparatus A according to the Embodiment 1. As for the general coding process in JPEG 2000, which is described above in "(1-1) Description of Coding Process Using Multiple Layers", a brief description thereof is given below.

Figure 4:
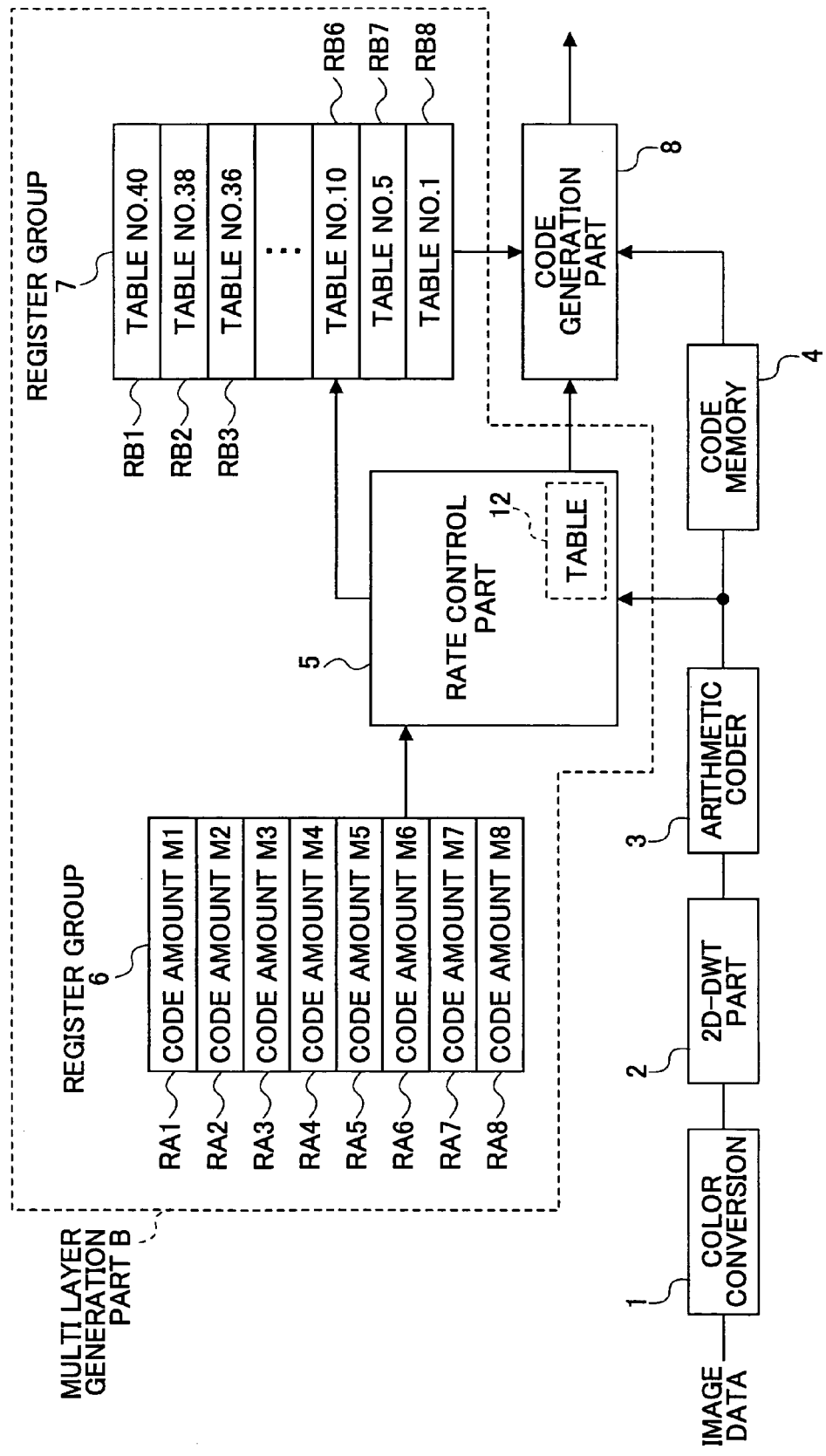
FIG. 4 is a block diagram of the image processing apparatus according to Embodiment 1 of the present invention.

FIG. 4 is a block diagram of the image processing apparatus A. The image processing apparatus A includes a color conversion part 1, a two-dimensional discrete wavelet transform (2D-DWT) part 2, an arithmetic coder 3, a code memory 4, a rate control part 5, a register group 6 storing specified amounts of codes, the register group 7 for table number T, and a code generation part 8.

Image data input to the image processing apparatus A are first converted into three color components, i.e., Y, Cb and Cr, by the color conversion part 1. The data of each of the color components are output in parallel to each of the functional blocks subsequent to the color conversion part 1.

The three color components, i.e., Y, Cb and Cr, which are output from the color conversion part 1 are transformed into 16-bit wavelet coefficients by the 2D-DWT part 2.

The 16-bit wavelet coefficients are converted by the arithmetic coder 3 to MQ codes structured by 46 coding paths CP1 through CP46. The data of the MQ codes are recorded in the code memory 4.

FIG. 5 is a map in the code memory 4. As shown in FIG. 5, subbands 3LL, 3HL, 3LH, 3HH, 2HL, 2LH, 2HH, 1HL, 1LH and 1HH are stored in this order from the top address. Also, within each of the subbands, the coding paths CP1 through CP46 are stored in this order.

Referring again to FIG. 4, the rate control part 5, the register group 6, and the register group 7, which are surrounded by the dotted line, function as a multi-layer generation part B that divides the MQ codes generated by the arithmetic coder 3 into plural layers sequentially from those corresponding to the higher bit-planes such that the code amount of each of the layers becomes a predetermined value or less.

The register group 6 storing the specified amounts of codes is structured by eight registers in total, i.e., RA1 through RA8. The register RA1 stores codes of the predetermined code amount M1. The other registers RA2 through RA8 store codes of the code amounts M2 through M8, respectively. The values of the code amounts M2 through M8 are sequentially increased for a fixed amount with respect to the code amount M1. The register group 7 for table number T is structured by eight registers in total, i.e., RB1 through RB8. The registers RB1 through RB8 store numbers T of truncation tables that realize, by the function of the rate control part 5 described later, the code amounts M1 through M8 stored in the registers RA1 through RA8, respectively, of the register group 6 storing the specified code amount.

The rate control part 5 reads the value of the code amount M1 from the register RA1 of the register group 6, specifies a truncation table number T with which the amount of MQ codes becomes close to the code amount M1 and equal to or less than the code amount M1, and stores the specified value T in the corresponding register RB1 of the register group 7 as mentioned above. This process is performed with respect to all of the code amounts M2 through M8 stored in the other registers RA2 through RA8 of the register group 6, and the specified truncation table numbers are stored in the registers RB2 through RB8 of the register group 7, respectively.

After the rate control part 5 completes the calculation process of the eight truncation table numbers T with which the code amounts M1 through M8 are realized, respectively, the code generation part 8 performs data discard of coding paths in accordance with truncation data of the truncation table of the number T stored in the register RB1 of the register group 7, specifies coding paths for each subband constituting the layer 1, generates a packet header based on the specified coding paths, and generate coded data.

Continuously, the code generation part 8 performs data discard of coding paths in accordance with truncation data of the truncation table of the number T stored in the register RB2 of the register group 7, specifies coding paths to be added as the layer 2 to the coding paths constituting the layer 1, generates a packet header based on the specified coding paths, and generates coded data.

Subsequently, as shown in FIG. 6, with respect to each of the table numbers T of the truncation table stored in the registers RB3, RB4, . . . , and RB8 of the register group 7, the code generation part 8 repeats the process of sequentially specifying coding paths to be further added to the coding paths included in the layer 1 through the immediately preceding layer, generates a packet header by using the specified coding paths as a new layer, and generating coded data.

The layer 1 through layer 8 of coded data generated by the code generation part 8 may be, for example, as shown in FIG. 7.

(1-3) Structure of the Rate Control Part 5

Figure 8:
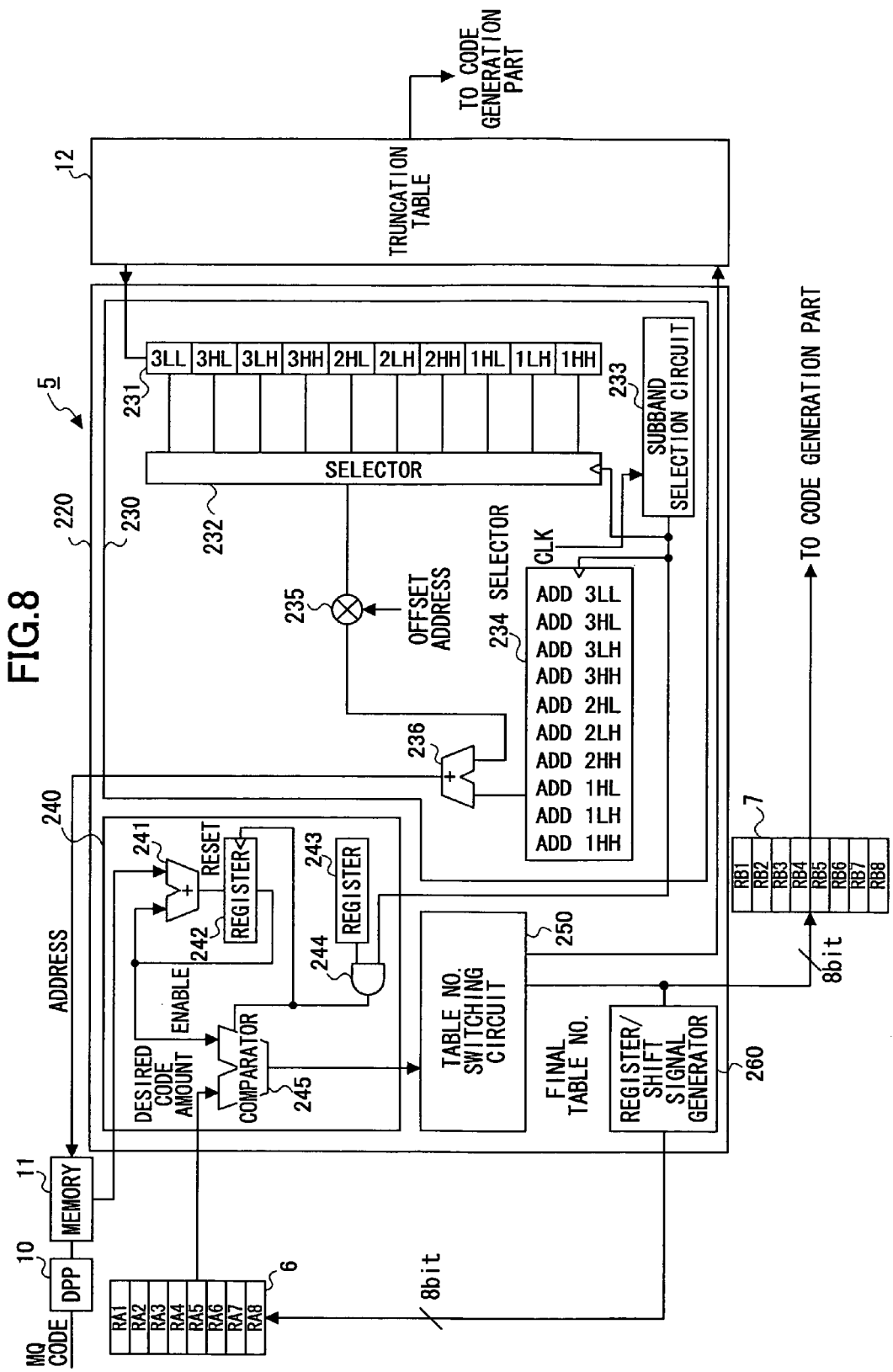
FIG. 8 is a block diagram showing the structure of a rate control part.

FIG. 8 is a block diagram showing a structure of the rate control part 5. The rate control part 5 includes a data processing part (DPP) 10, a memory 11, a rate control circuit 220, and a truncation table 12.

(1-3-1) Data Processing Part (DPP)

(1-3-1-1) Overview

The data processing part 10 obtains the residual amounts of codes in the case where data of coding paths are discarded subsequently from CP46 for each subband based on the data of MQ codes output from the arithmetic coder 3, and sequentially writes the obtained amounts of codes in the memory 11 at the same intervals, that is, at the uniform address intervals ($ADD_{off}$).

(1-3-1-2) Detailed Description

Figure 9:
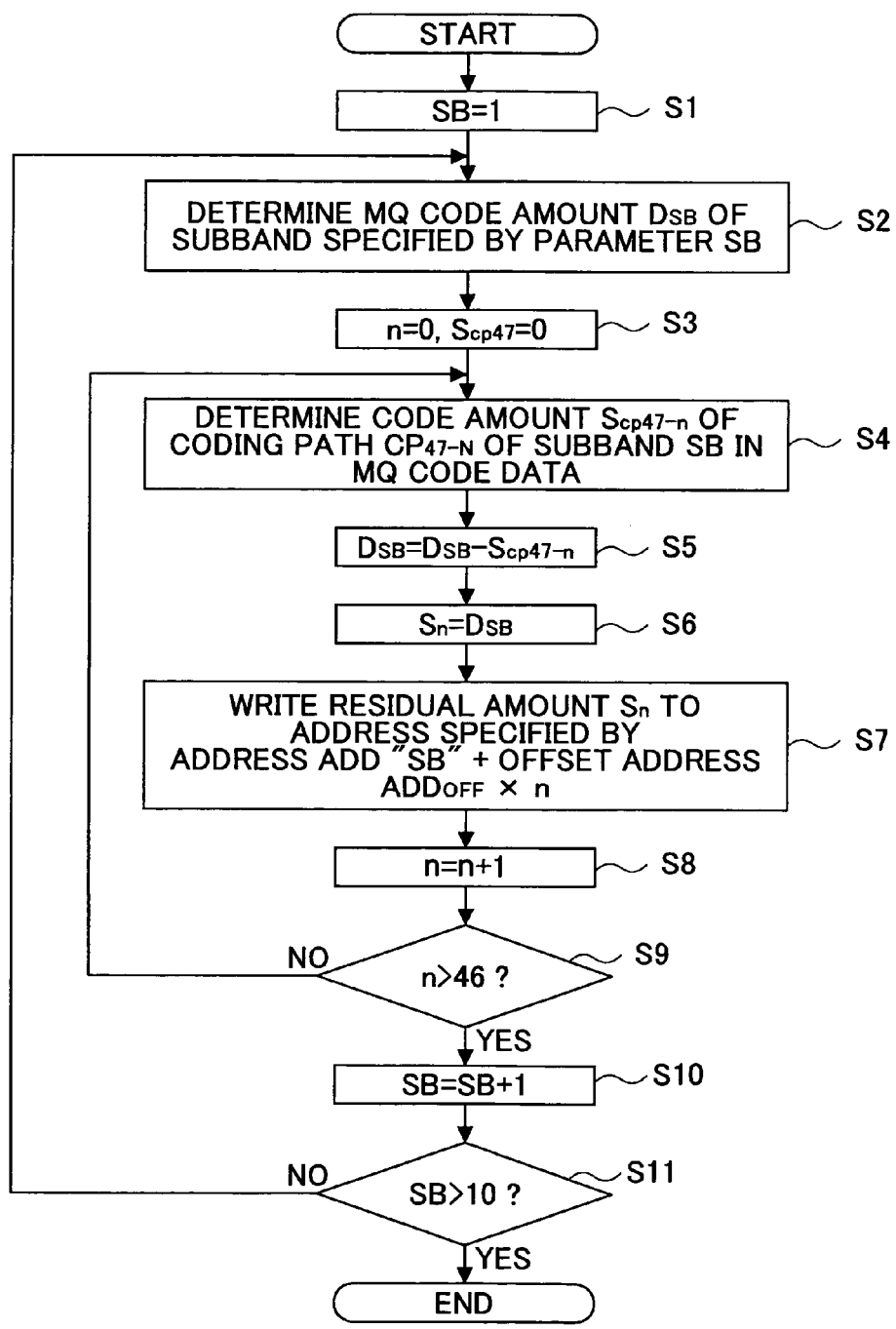
FIG. 9 is a flowchart for explaining processes performed by a data processing part (DPP)

FIG. 9 is a flowchart for explaining processes performed in the data processing part 10. By inputting the flowchart to a logic synthesis tool manufactured by Synopsys, Inc. (USA), a specific circuit is automatically designed.

First, subbands corresponding to values of a subband specifying parameter SB are defined. That is, SB=1 corresponds to 3LL, SB=2 corresponds to 3HL, SB=3 corresponds to 3LH, and SB=4 corresponds to 3HH. SB=5 corresponds to 2HL, SB=6 corresponds to 2LH, and SB=7 corresponds to 2HH. SB=8 corresponds to 1HL, SB=9 corresponds to 1LH, and SB=10 corresponds to 1HH.

In step S1, the value of the parameter SB is set to 1. In step S2, the amount of MQ codes of the subband specified by the parameter SB is input to a variable $D_{SB}$, which represents the code amount after data discard. In step S3, initial setting is performed: a parameter n specifying the number of coding paths to be subjected to data discard is set to 0, and a code amount $S_{CP47}$ of a 47th coding path CP47, which does not exist, is set to 0.

After the above-mentioned initial setting, in step S4, a MQ code amount $S_{CP47-n}$ of the (47-n)th coding path CPn of the subband specified by the parameter SB in the MQ coded data is determined.

In step S5, the variable $D_{SB}$ is updated to a value obtained by subtracting a MQ code amount $S_{CP47-n}$ of the (47-n)th coding path CP47-n from the variable $D_{SB}$.

In step S6, the value of the updated $D_{SB}$ is set to a code amount Sn, which represents the amount of codes after the data of n coding paths corresponding to lower bit-planes are discarded.

In step S7, the code amount Sn after code discard is written to the address specified by a formula: address ADD "SB"+ offset address $ADD_{OFF} \times n$. It should be noted that the address ADD "SB" is a write top address of the code amount Sn of the subband specified by the value of the parameter SB, the offset address $ADD_{OFF}$ is a value representing the above-mentioned uniform address interval (see FIG. 10).

In step S8, the value of the parameter n is incremented by 1. In step S9, whether n is greater than 46 is determined. When the value of n is 46 or less (NO in step S9), the process returns to step S4. The processes of steps S4 through S8 are repeated until the value of n is larger than 46. Thereby, with respect to the subband specified by the value of the parameter SB, the code amount in a state where data discard of coding paths is not performed and the code amounts Sn in the case where the data of a coding path are discarded one by one in the order of CP46, CP45, CP44, . . . , and CP1 in this order are written in the memory 11 at the interval of the offset address $ADD_{OFF}$.

When the value of n is larger than 46 (YES in step S9), the value of the parameter SB, which specifies a subband, is incremented by 1 in step S10. In step S11, it is determined whether the value of the parameter SB is larger than 10. When the value of the parameter SB is 10 or less (NO in step S11), the process returns to step S2. When the value of the parameter SB is larger than 10 (YES in step S11), the process ends. In the aforementioned manner, it is possible to write in the memory 11 the data of the residual code amounts in the cases where data of coding paths are gradually discarded by one coding path at a time with respect to each subband.

It is conceivable to perform the above-mentioned data processing by software processing in addition to a hardware circuit formed by inputting the flowchart of FIG. 9 to the logic synthesis tool manufactured by Synopsys, Inc. (USA). In this case, it would be easy for a person skilled in the art to form the data processing part 10 by a central processing unit (CPU), a ROM and a RAM connected to an input line of MQ code and a data output line to the memory 11 via one or more buses. The ROM stores a program performing the processes shown in the flowchart of FIG. 9. The CPU develops the program in the RAM and performs the above-mentioned data processing. When performing the data processing, the CPU causes the RAM to temporarily store input MQ coded data, thereby using the RAM as work memory for obtaining the MQ code amount of each subband and the MQ code amount of each coding path.

(1-3-2) Memory

Figure 10:
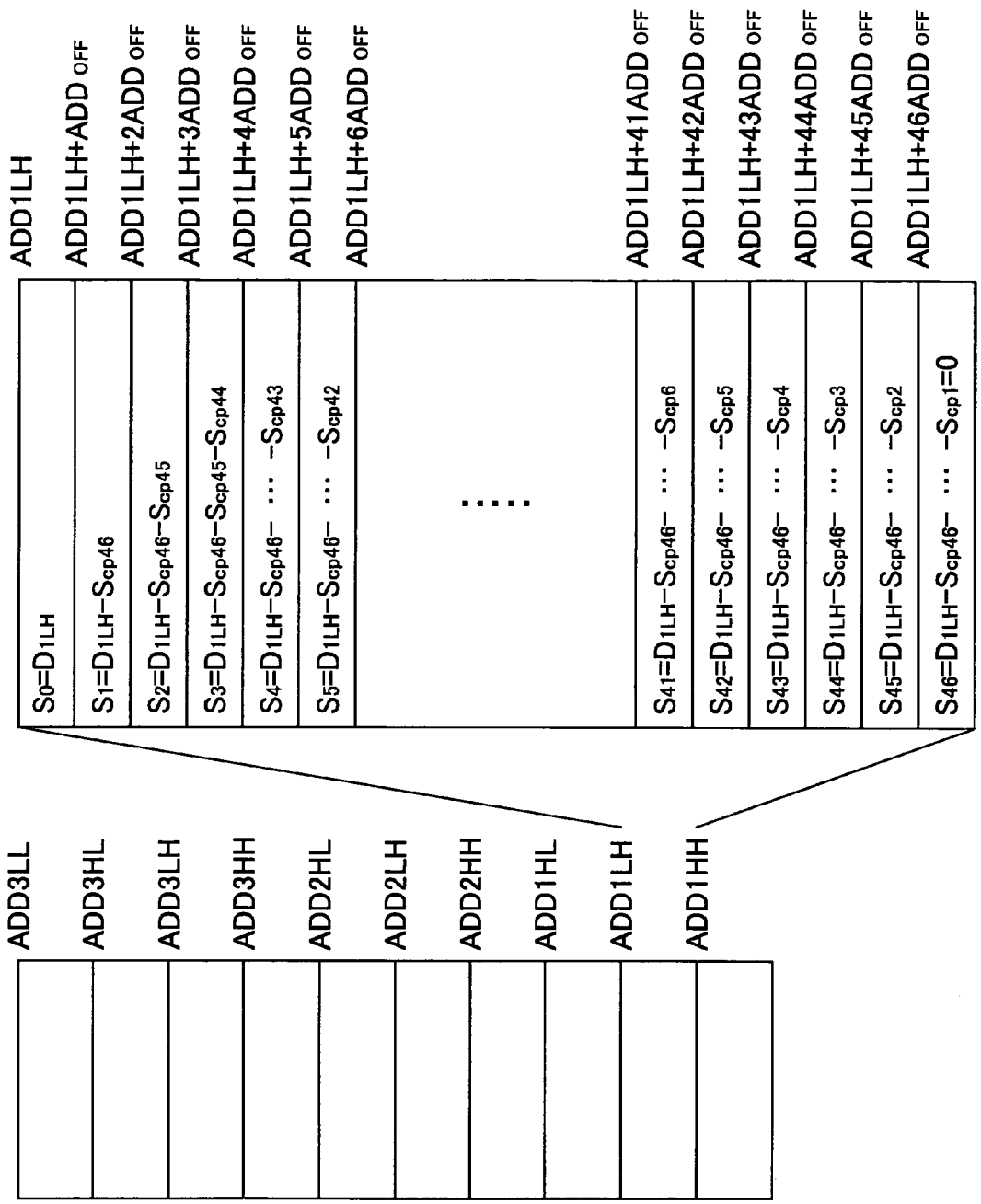
FIG. 10 is a memory map of a memory in the rate control part.

FIG. 10 shows a memory map in the memory 11. The residual amount Sn of MQ codes in the cases where, among the 46 coding paths of the subband 3LL, data are discarded sequentially from the data of the coding path CP46 corresponding to the least significant bit-plane, CP45, CP44, . . . , and CP1 are written in address ADD3LL. The same applies to addresses ADD3HL, ADD3LH, ADD2HL, ADD2LH, ADD2HH, ADD1HL, ADD1LH and ADD1HH.

FIG. 10 also shows residual amounts S0 through S46 of the MQ codes written to the space between the addresses ADD1LH and ADD1HH. In FIG. 10, the MQ code amount of the subband 1LH (total amount of MQ codes of the coding paths CP1 through CP46) is represented by D1LH (corresponding to the initial value of $D_{SB=9}$ set in step S2 of the flowchart of FIG. 9), and the MQ code amounts of the coding paths CP1 through CP46 are represented by $S_{CP1}$ through $S_{CP46}$, respectively (as in the flowchart of FIG. 9).

The residual amount Sn of MQ codes (it should be noted that n is the variable n shown in FIG. 9 and the value thereof is from 0 to 46) is represented by data of a fixed number of bits (for example, 20 bits). With the above-mentioned data processing (FIG. 9), data representing the residual amounts Sn of MQ codes are sequentially written to addresses (ADD1LH, ADD1LH+$ADD_{OFF}$, ADD1LH+2×$ADD_{OFF}$, ADD1LH+3× $ADD_{OFF}$, ADD1LH+46×$ADD_{OFF}$) obtained by adding to the address ADD1LH the offset address $ADD_{OFF}$, which secures a data write area for 20 bits, for the number of coding paths to be subjected to data discard.

(1-3-3) Truncation Table

As partially shown in FIG. 3, the truncation table 12 stores, for example, several hundred of truncation tables No. 1 through No. XXX in total. Truncation data specify the number of coding paths to be subjected to data discard for each of the subbands 3LL, 3HL, 3LH, 3HH, 2HL, 2LH, 2HH, 1HL, 1LH and 1HH with respect to three components Y, Cb and Cr.

The truncation table 12 is structured by, for example, a large number of registers. The truncation table 12 outputs to the rate control circuit 220 truncation data recorded in the register corresponding to a read request signal of truncation data of a table number T that is output from the rate control circuit 220.

(1-3-4) Rate Control Circuit 220

The rate control circuit 220 generally includes an address generation circuit 230, a code amount calculation circuit 240, a table number switching circuit 250 and a register/shift signal generator 260. A detailed description of each of these components is given below.

(1-3-4-1) Address Generation Circuit 230

(1-3-4-1-1) Overview

The address generation circuit 230 reads from the truncation table 12 the truncation data of a table number T that is output from the table number switching circuit 250, and forms and outputs the addresses in the memory 11, which stores for each subband the code amounts after data discard of coding paths based on the truncation data.

(1-3-4-1-2) Detailed Description

For convenience of explanation, a description is given below of only the Cb component among the truncation data input from the truncation table 12. A circuit having the same structure is applied to the other components, which are separately processed.

The input truncation data are input to a register group 231 structured by 10 registers in total, each storing 6-bit data. The truncation data are data formed by arranging 10 kinds of 6-bit data that can represent 46 values at the maximum, i.e., 6-bit data corresponding to the subbands 3LL, 3HL, 3LH, 3HH, 2HL, 2LH, 2HH, 1HL, 1LH and 1HH, in the order of 1HH, 1LH, 1HL, 2HH, 2LH, 2HL, 3LL, 3LH, 3HL and 3HH. The register group 231 stores and outputs, to a selector 232, 6-bit data corresponding to the registers for respective subbands.

In accordance with a selection signal output from a subband selection circuit 233, the selector 232 outputs to one of the signal input terminals of a multiplier 235 the truncation data in the order of subbands 3LL, 3HL, 3LH, 3HH, 2HL, 2LH, 2HH, 1HL, 1LH and 1HH. The value of the offset address $ADD_{OFF}$ is input to the other of the signal input terminals of the multiplier 235. The multiplier 235 outputs, to one of the signal input terminals of the adder 236, offset addresses of the number of coding paths to be subjected to data discard specified by the truncation data of the subband selected by the selection signal.

The subband selection circuit 233 updates the selection signal to a value to select the subsequent subband in synchronization with a click signal CLK, which is input as a request signal for the selection signal, and outputs the updated selection signal. The selection signal output by the subband selection signal 233 is input also to a selector 234. The selector 234 outputs, to the other of the signal input terminals of the adder 236, the top address ADD of the subband specified by the selection signal, that is, ADD3LL, ADD3HL, ADD3LH, ADD3HH, ADD2HL, ADD2LH, ADD2HH, ADD1HL, ADD1LH OR ADD1HH.

With the above-mentioned structure, the adder 236 generates an address for storing data of the residual code amount in the case of performing data discard on the coded data of coding paths of the number obtained by adding a mask amount to the number specified by the truncation data of the subband selected by the selection signal from the least significant bit-plane. The adder 236 outputs the generated address to a memory C or a memory D.

(1-3-4-2) Code Amount Calculation Circuit 240

(1-3-4-2-1) Overview

The code amount calculation circuit 240 obtains a total value with respect to all subbands of the MQ code amount Sn after data discard of each subband read by the address output from the address generation circuit 230. The code amount calculation circuit 240 compares the obtained total value with a target code amount (M1 through M8) output from a corresponding register of the register group 6, and outputs to the table number switching circuit 250 a signal representing the comparison result.

(1-3-4-2-2) Detailed Description

The data of the MQ code amount Sn after data discard, which data are read from the memory 11 by the code amount calculation circuit 240, are input to one of the signal input terminals of an adder 241. The value of a register 242, which stores the output of the adder 241, is input to the other of the signal input terminals of the adder 241. With such a structure, the total value of the code amount of each subband read from the memory 11 is stored in the register 242 until a reset signal is input to the register 242.

The selection signal output from the subband selection circuit 233 of the address generation circuit 230 is input to one of the signal input terminals of a two-input AND gate 244. The other of the signal input terminals of the two-input AND gate 244 is connected to a register 243. The register 243 stores the value of the selection signal that is output after the subband selection circuit 233 outputs the selection signal to select the subband 1HH, i.e., the subband selection circuit 233 outputs the selection signals of all subbands, until the first subband 3LL is selected again.

With the above-mentioned structure, the two-input AND gate 244 outputs a high-level enable signal to an enable terminal of a comparator 245 at the timing before selecting the first subband 3LL again after outputting the selection signals of all subbands, thereby switching the relevant circuit (comparator 245) to enable.

The comparator 245 draws a comparison between a target code amount and the code amount after data discard, which code amount is output from the register 242, and outputs a comparison result signal to the table number switching circuit 250.

(1-3-4-3) Table Number Switching Circuit 250

(1-3-4-3-1) Overview

Based on the value of the comparison result signal output from the code amount calculation circuit 240, the table number switching circuit 250 determines whether it is necessary to change the truncation table. When it is determined to be necessary to change the truncation table, the table number switching circuit 250 switches the table number and outputs again the switched table number to the truncation table 12. On the other hand, when it is determined based on the value of the comparison result signal that the selected truncation table is appropriate, the table number switching circuit 250 outputs the selected truncation table to a corresponding register (RB1 through RB8) of the register group 7 as the final table number.

(1-3-4-3-2) Detailed Description

Figure 11:
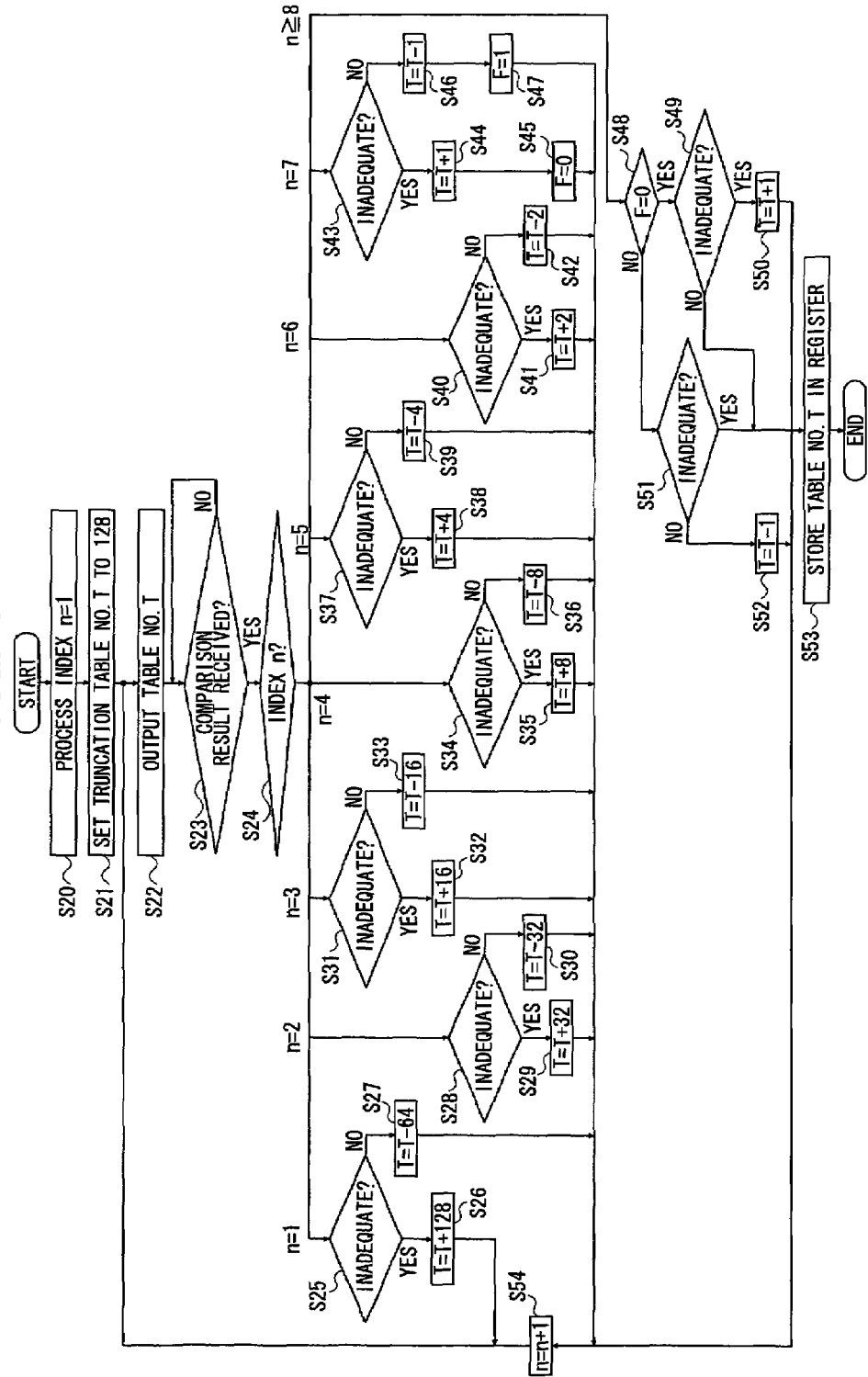
FIG. 11 is a flowchart for explaining processes performed by a table number switching circuit.

FIG. 11 is a flowchart for explaining processes of the table number switching circuit 250. By inputting the flowchart of FIG. 11 to the logic synthesis tool manufactured by Synopsys, Inc. (USA), a specific circuit is automatically designed. A description is given below of the flowchart of FIG. 11.

In step S20, the value of a process index is set to 1. In step S21, the truncation number T is set to 128. In step S22 the set truncation number T is output to the truncation table 12. In step S23, it is determined whether the comparison result signal is received from the comparator 245 of the code amount calculation circuit 240. The comparison result signal indicates the result of a comparison between the target code amount and the residual amount of MQ codes of all subbands calculated based on the truncation data of the table number T. Step S23 is repeated until the decision result becomes YES. When the comparison result signal is received (YES in step S23), the process proceeds to step S24. In step S24, it is determined whether the value of the process index n is 1, 2, 3, 4, 5, 6, 7, or 8 or more. Processes subsequent to step S24 are performed in accordance with the value of the process index n then and depending on whether the comparison result signal indicates that the residual amount of MQ codes is greater than the target code amount (in the case of high level) or less than the target code amount (in the case of low level).

Specifically, when the value of the process index n is 1 and the reduction amount of MQ codes, i.e., the number of coding paths to be subjected to discarding of MQ codes, is inadequate (when the comparison result signal is at high level, i.e., YES in step S25), the process proceeds to step S26. In step S26, 128 is added to the value (=128) of the current table number T, and the process returns to step S22. Thus, when the reduction amount of MQ codes is inadequate in step S25, the value of the process index is maintained at 1.

On the other hand, when the reduction amount of MQ codes is adequate (when the comparison result signal is at low level, i.e., NO in step S25), the process proceeds to step S27. In step S27, 64 is subtracted from the value (=128) of the current table number T. Then, the process proceeds to step S54, where 1 is added to the value of the process index n, and the process returns to step S22.

When the value of the process index is 2 in step S24 and the reduction amount of MQ codes is inadequate (when the comparison result signal is at high level, i.e., YES in step S28), the process proceeds to step S29. In step S29, 32 is added to the value of the table number T, and then the process proceeds to step S54. In step S54, 1 is added to the value of the process index n, and the process returns to step S22.

When the reduction amount of MQ codes is adequate (when the comparison result signal is at low level, i.e., NO in step S28), the process proceeds to step S30. In step S30, 32 is subtracted from the value of the table number T, and the process proceeds to step S54. In step S54, 1 is added to the value of the process index n, and the process returns to step S22.

When the value of the process index n is 3 in step S24 and the reduction amount of MQ codes is inadequate (when the comparison result signal is at high level, i.e., YES in step S31), the process proceeds to step S32. In step S32, 16 is added to the value of the table number T, and the process proceeds to step S54. In step S54, 1 is added to the value of the process index n, and the process returns to step S22.

On the other hand, when the reduction amount of MQ codes is adequate (when the comparison result signal is at low level, i.e., NO in step S31), the process proceeds to step S33. In step S33, 16 is subtracted from the value of the table number T, and the process proceeds to step S54. In step S54, 1 is added to the value of the process index n, and the process returns to step S22.

When the value of the process index n is 4 in step S24 and the reduction amount of MQ codes is inadequate (when the comparison result signal is at high level, i.e., YES in step S34), the process proceeds to step S35. In step S35, 8 is added to the value of the table number T, and the process proceeds to step S54. In step S54, 1 is added to the value of the process index n, and the process returns to step S22.

On the other hand, when the reduction amount of MQ codes is adequate (when the comparison result signal is at low level, i.e., NO in step S34), the process proceeds to step S36. In step S36, 16 is subtracted from the value of the table number T, and the process proceeds to step S54. In step S54, 1 is added to the value of the process index n, and the process returns to step S22.

When the value of the process index n is 5 in step S24 and the reduction amount of MQ codes is inadequate (when the comparison result signal is at high level, i.e., YES in step S37), the process proceeds to step S38. In step S38, 4 is added to the value of the table number T, and the process proceeds to step S54. In step S54, 1 is added to the value of the process index n, and the process returns to step S22.

On the other hand, when the reduction amount of MQ codes is adequate (when the comparison result signal is at low level, i.e., NO in step S37), the process proceeds to step S39. In step S39, 4 is subtracted from the value of the table number T, and the process proceeds to step S54. In step S54, 1 is added to the value of the process index n, and the process returns to step S22.

When the value of the process index n is 6 in step S24 and the reduction amount of MQ codes is inadequate (when the comparison result signal is at high level, i.e., YES in step S40), the process proceeds to step S41. In step S41, 2 is added to the value of the table number T, and the process proceeds to step S54. In step S54, 1 is added to the value of the process index n, and the process returns to step S22.

On the other hand, when the reduction amount of MQ codes is adequate compared to the target reduction amount (when the comparison result signal is at low level, i.e., NO in step S40), the process proceeds to step S42. In step S42, 2 is subtracted from the value of the table number T, and the process proceeds to step S54. In step S54, 1 is added to the value of the process index n, and the process returns to step S22.

When the value of the process index n is 7 in step S24 and the reduction amount of MQ codes is inadequate (when the comparison result signal is at high level, i.e., YES in step S43), the process proceeds to step S44. In step S44, 1 is added to the value of the table number T. In step S45, the value of a flag F is set to 0, and the process proceeds to step S54. In step S54, 1 is added to the value of the process index n, and the process returns to step S22.

On the other hand, when the reduction amount of MQ codes is adequate (when the comparison result signal is at low level, i.e., NO in step S43), the process proceeds to step S46. In step S46, 1 is subtracted from the value of the table number T, and the process proceeds to step S54. In step S54, 1 is added to the value of the process index n, and the process returns to step S22.

When the value of the process index n is 8 or more in step S24, processes are performed in accordance with the value of the flag F. In step S48, it is determined whether the value of the flag F is 0. That is, when the value of the flag F is 0 (YES in step S48) and the reduction amount of MQ codes is inadequate (when the comparison result signal is at high level, i.e., YES in step S49), the process proceeds to step S50. In step S50, 1 is added to the value of the table number T, and the process proceeds to step S54. In step S54, 1 is added to the value of the process index n, and the process returns to step S22.

On the other hand, when the value of the flag F is 1 (NO in step S48) and when the reduction amount of MQ codes is adequate (when the comparison result signal is at low level, i.e., NO in step S51), the process proceeds to step S52. In step S52, 1 is subtracted from the value of the table number T, and the process proceeds to step S54. In step S54, 1 is added to the value of the process index n, and the process returns to step S22.

When the value of the flag F is 0 (YES in step S48) and when the reduction amount of MQ codes is adequate (when the comparison result signal is at low level, i.e., NO in step S49), or when the value of the flag F is 0 (NO in step S48) and when the reduction amount of MQ codes is inadequate (when the comparison result signal is at high level, i.e., YES in step S51), the state where the reduction amount of MQ codes is inadequate compared to the target reduction amount is changed to the state where the reduction amount of MQ codes is adequate, or the state where the reduction amount of MQ codes is adequate compared to the target reduction amount is changed to the state where the reduction amount of MQ codes is inadequate merely by incrementing/decrementing the number of truncation data by 1. In other words, it is possible to consider that the reduction amount of MQ codes reaches the target reduction amount. Hence, in step S53, considering the truncation data recorded in the table number T then as the data to be finally used, a signal representing the relevant table number T is output to a corresponding register of the register group 7 and the process ends.

It should be noted that the above-mentioned data processing may be performed by software processing in addition to a hardware circuit formed by inputting the flowchart of FIG. 11 to the logic synthesis tool manufactured by Synopsys, Inc (USA). In this case, it would be easy for a person skilled in the art to form the table number switching circuit 250 by a central processing unit (CPU), a ROM and a RAM connected to an input line of the comparison result signal and a data output line to the truncation table 12 and the register group 7 via one or more buses. The ROM stores a program performing the processes shown in the flowchart of FIG. 11. The CPU develops the program in the RAM and performs the above-mentioned data processing. When performing the data processing, the CPU uses the RAM as work memory.

(1-3-4-4) Register Shift Signal Generator 260

(1-3-4-4-1) Overview

Every time data of the final table number T are output from the table number switching circuit 250, the register shift signal generator (register shift signal generating circuit) 260 enables the next register among the register groups 6 and 7 each structured by 8 registers in total.

(1-3-4-4-2) Detailed Description

The register shift signal generating circuit 260 is formed by an 8-bit shift register in which only 1-bit data are set to "1". The data are shifted in response to data output of the final table number T from the table number switching circuit 250. The shifted 8-bit data are subjected to parallel conversion into 1-bit data, and 1-bit data are output to respective enable terminals of the registers RA1 through RA8 of the register group 6 and the registers RB1 through RB8 of the register group 7.

(2) Embodiment 2

An image processing apparatus according to Embodiment 2 of the present invention has the structure (block diagram thereof is omitted) fundamentally the same as that of the image processing apparatus A described above. In the image processing apparatus according to Embodiment 2, the rate control part 5 shown in FIG. 4 is realized by software processing. In the following description, those parts that are the same as those corresponding parts of the image processing apparatus A are designated by the same reference numerals, and a description thereof is omitted.

(2-1) Structure of Rate Control Part

Figure 12:
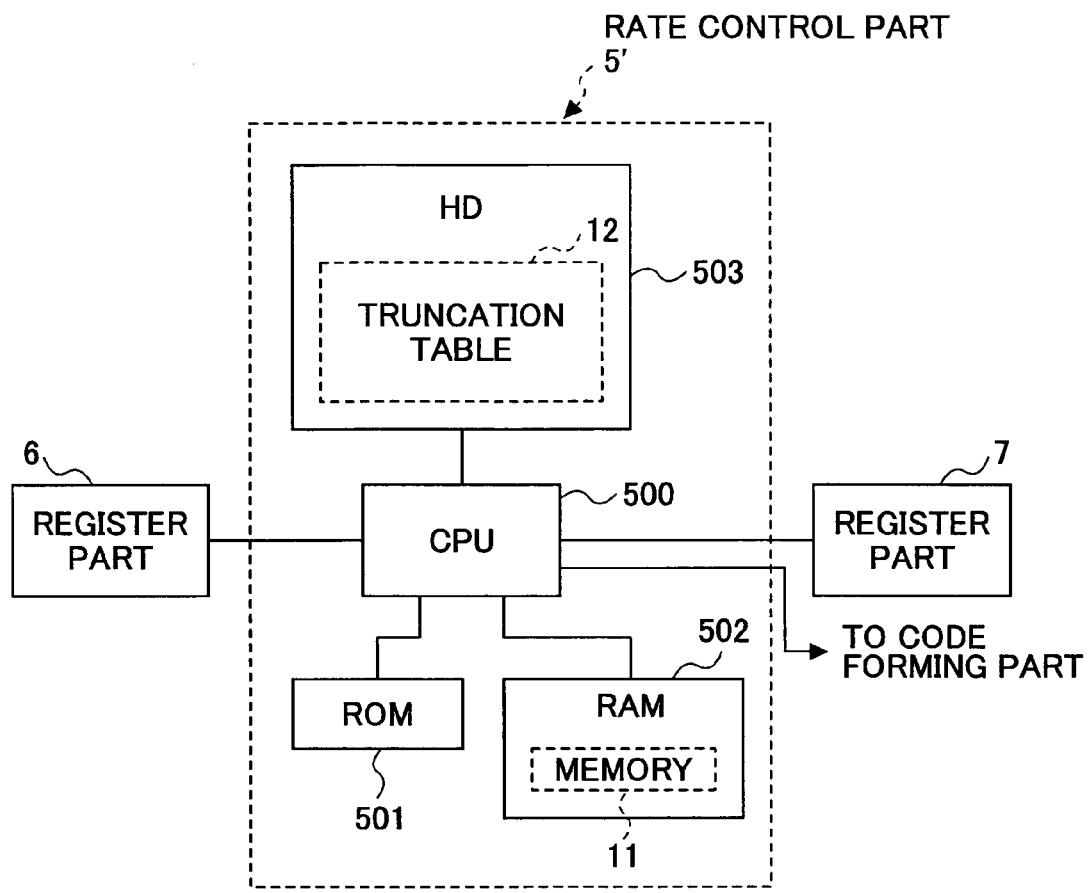
FIG. 12 is a block diagram showing the structure of a rate control part of an image processing apparatus according to Embodiment 2 of the present invention.

FIG. 12 is a block diagram showing the structure of a rate control part 5' of the image processing apparatus according to Embodiment 2. The rate control part 5' includes a central processing unit (hereinafter referred to as "CPU") 500, a ROM 501, a RAM 502 and a hard disk (HD) 503.

The ROM 501 stores a program of a rate control process described below. The RAM 502 secures an area corresponding to the memory 11 (see FIG. 8) of the rate control part 5 of the image processing apparatus A. The area is used as a work area at the time of execution of the program. The hard disk 503 stores all data of the truncation table 12 of the rate control part 5 of the image processing apparatus A.

(2-2) Rate Control Process

Figure 13:
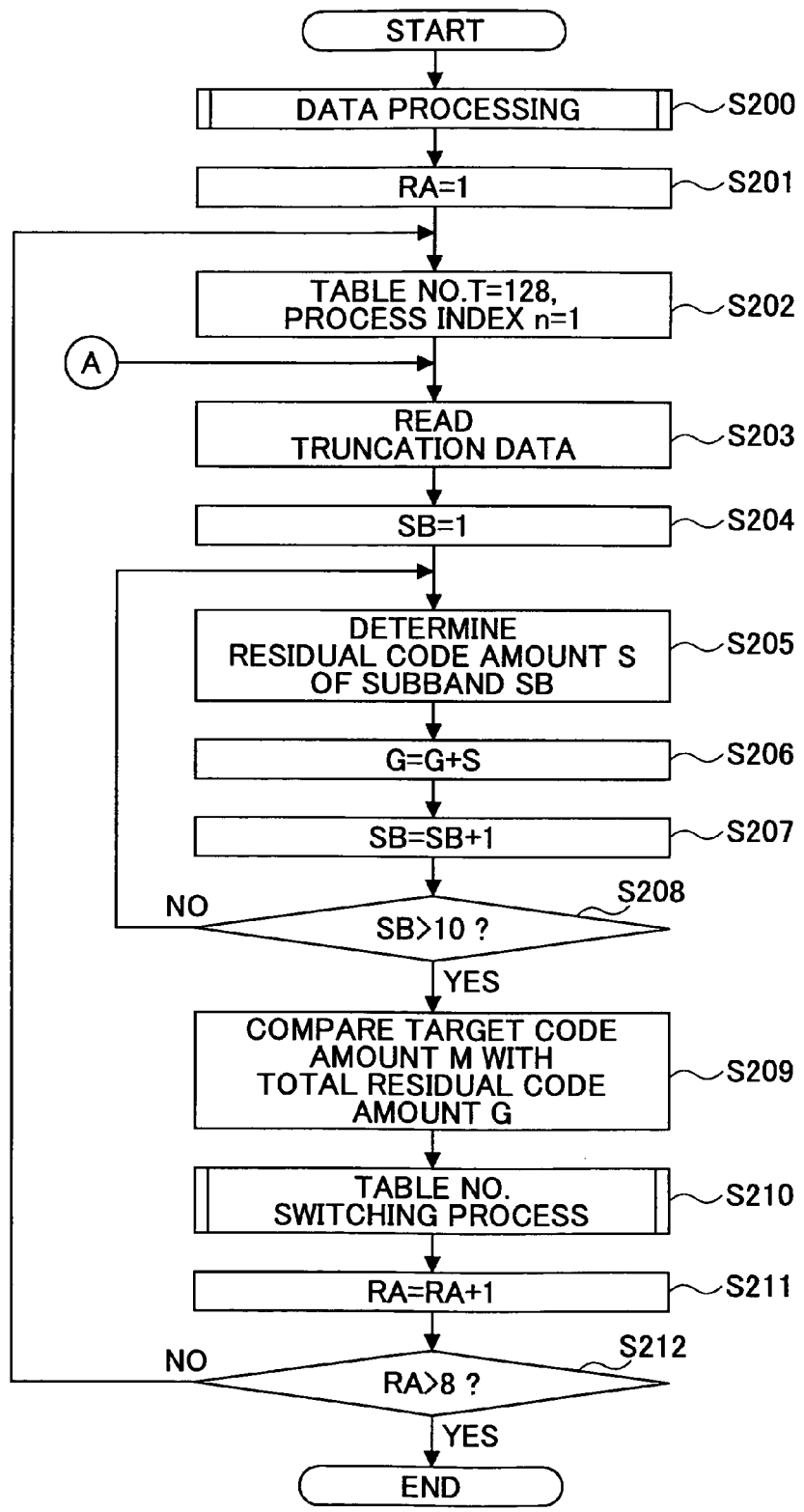
FIG. 13 is a flowchart for explaining processes of a program executed by a central processing unit (CPU) of the rate control part.

FIG. 13 is a flowchart for explaining the program of the rate control process stored in the ROM 501 and executed after being written to the RAM 502 at the time of operation. A description is given below of processes performed by the CPU 500 with reference to the flowchart of FIG. 13.

In step S200, the CPU 500 performs data processing, which is the same as that performed in the data processing part 10 of the rate control part 5 of the image processing apparatus A. With the data processing, an area corresponding to the memory 11 and having a memory map (data, addresses) the same as that shown in FIG. 10 is formed in the RAM 502.

Since the specific procedure of the data processing is the same as that shown in the flowchart of FIG. 9, a detailed description thereof is omitted.

In step S201, the value of a parameter RA, which specifies a register to be used among the eight registers RA1 through RA8 constituting the register group 6, is set to 1. In step S202, initial setting is performed: the value of the table number T is set to 128, and the value of the process index n is set to 1. In step S203, the truncation data of the table number T are read from the truncation table 12 stored in the hard disk 503, and the number of coding paths to be subjected to discarding of MQ codes is specified for each subband.

In step S204, the value of the subband specifying parameter SB is set to 1. The subband specifying parameter SB is used in the data processing in step S200: SB=1 corresponds to 3LL, SB=2 corresponds to 3HL, SB=3 corresponds to 3LH, SB=4 corresponds to 3HH, SB=5 corresponds to 2HL, SB=6 corresponds to 2LH, SB=7 corresponds to 2HH, SB=8 corresponds to 1HL, SB=9 corresponds to 1LH, and SB=10 corresponds to 1HH.

When the number of coding paths to be subjected to data discard of the subband SB specified in step S203 is P, in step S205, a residual amount Sp of MQ codes in the case where the code data of P coding paths are discarded is read from the memory 11 in the RAM 502. In step S206, the value of the residual amount Sp is added to the value of the total residual amount G of MQ codes of all subbands. In step S207, the value of the subband specifying parameter SB is incremented by 1. In step S208, whether the value of the parameter SB is larger than 10 is determined. When the value of the parameter SB is 10 or less (NO in step S208), the process returns to step S205. When the value of the parameter SB is larger than 10 (YES in step S208), the process proceeds to step S209. In step S209, the value of the target code amount M is read from RAn (n: the value of the parameter RA that is set in step S201) of the register group 6, compared with the total residual amount G, and a high-level comparison result signal is generated when the residual code amount G is equal to or larger than the target code amount M and a low-level comparison result signal is generated when the residual code amount G is less than the target code amount M.

In step S210, the table number switching process is performed, which process is described below in detail. In step S211, the value of the parameter RA, which specifies a register of the register group 6, is incremented by 1. In step S212, it is determined whether the value of the parameter RA is larger than 8. When the value of the parameter RA is 8 or less (NO in step S212), the process returns to step S202. On the other hand, when the value of the parameter RA is larger than 8 (YES in step S212), the process ends.

Figure 14:
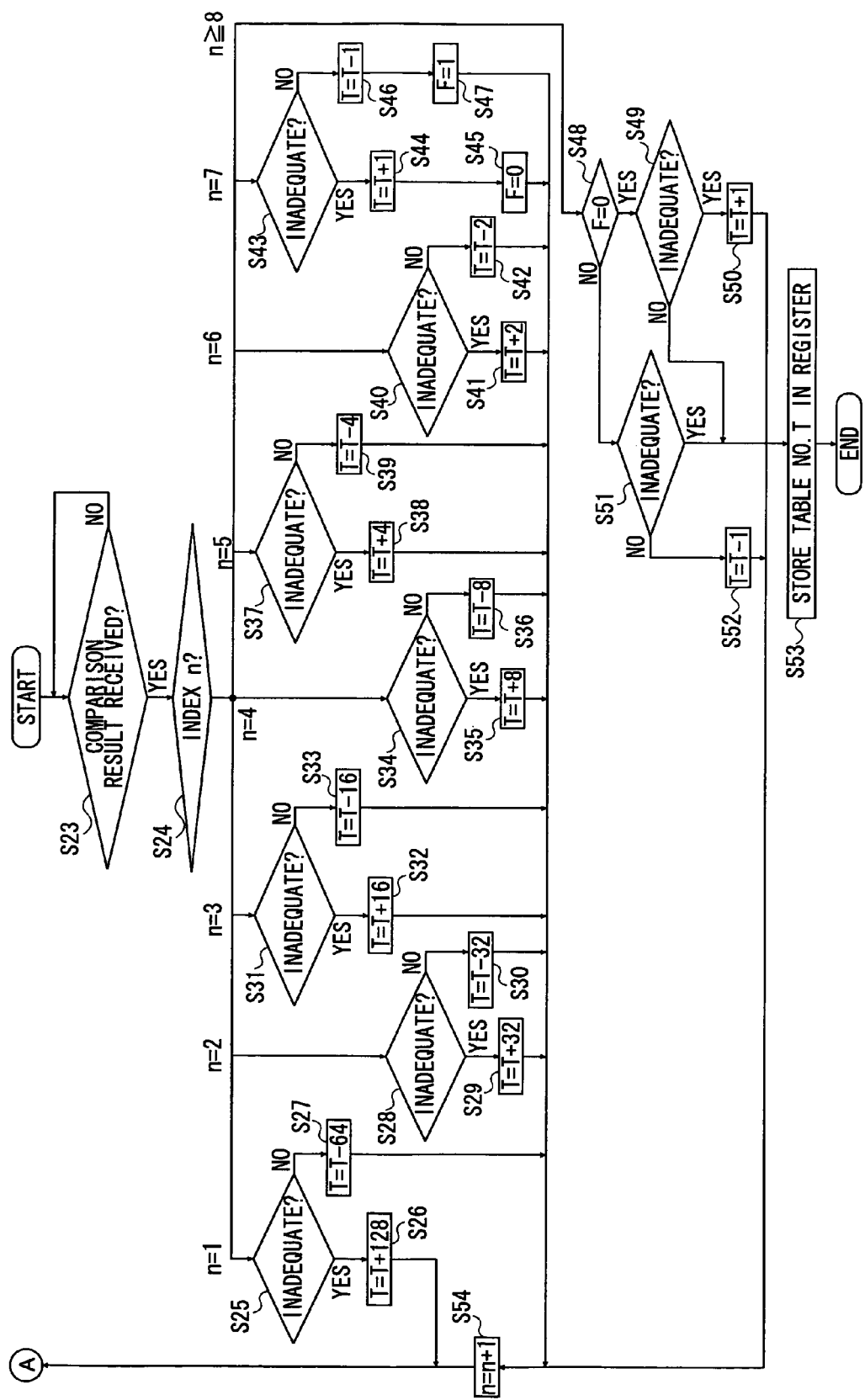
FIG. 14 is a flowchart for explaining a table number switching process.

FIG. 14 is a flowchart for explaining the table number switching process performed in step S210 of the flowchart of FIG. 13. Fundamentally, the table number switching process is the same as that performed by the table number switching circuit 250, which is provided in the rate control circuit 220 forming the rate control part 5 of the image processing apparatus A according to Embodiment 1. In the flowchart of FIG. 14, those steps that are the same as those corresponding steps in the flowchart of FIG. 11, which is for explaining the processes performed by the table number switching circuit 250, are designated by the same step numbers.

The table number switching process begins with reception of the comparison result signal, which is generated in step S209 of the flowchart shown in FIG. 13. In step S23, it is determined whether the comparison result signal is received. Step S23 is repeated until the decision result becomes YES. The processes (steps S24 through S54) subsequent to step S23 are the same as those in the flowchart of FIG. 11, which is for explaining the processes performed by the table number switching circuit 250, except for that the process returns to step S203 of FIG. 13 after the processes of steps S26 and S54, and thus a description thereof is omitted.

(2-3) Variation

As mentioned above, in the image processing apparatus according to Embodiment 2 of the present invention, at least the rate control part 5 shown in FIG. 4 is realized by software processing. However, the entire processing part (the color conversion part 1, the 2D-DWT part 2, the arithmetic coder 3, the code memory 4 and the code generation part 8) including the rate control part 5 may be realized by software processing by a computer including, for example: a central processing unit; a ROM storing a processing program; a RAM used as work memory as well as the code memory 4, the memory 11, and the register groups 6 and 7; and a hard disk storing required data such as the data of the truncation table 12.

A coding process part that conforms to JPEG 2000 and is realized by software processing by a computer already exists, except for the multi-layer processing part B (the rate control part 5 and the register groups 6 and 7) shown in FIG. 4. It is possible for a person skilled in the art to easily cause a computer to function as the image processing apparatus A by additionally applying a program that realizes the rate control part 5' to a computer that performs a coding process conforming to JPEG 2000.

The present invention is not limited to the specifically disclosed embodiments, and variations and modifications may be made without departing from the scope of the present invention.

The present application is based on Japanese Priority Application No. 2003-340057 filed on Sep. 30, 2003, the entire contents of which are hereby incorporated by reference.

What is claimed is:

1. An image processing apparatus that divides data related to an image into bit-planes and performs a coding process on data of each of the bit-planes, the image processing apparatus comprising:
    a multi-layer generation part that divides codes obtained by the coding process into a plurality of layers sequentially from the codes corresponding to higher bit-planes such that an amount of the codes of each of the layers is equal to or less than a predetermined value;
    a code generation part that generates coded data in units of the codes divided into the respective layers by the multi-layer generation part; and
    a truncation cable including truncation data that specify the codes to be discarded sequentially from the codes corresponding to lower bit-planes for each of the blocks,
    wherein, based on the truncation table, the multi-layer generation part specifies for a top layer the truncation data of a table number with which quality of a reproduced image is maximized, and specifies for subsequent layers the truncation data of table numbers such that a difference between a code amount of one of the subsequent layers and a code amount after discarding based on the truncation data specified for a preceding layer is a predetermined value or less and the quality of the reproduced image is maximized.

2. The image processing apparatus as claimed in claim 1, wherein the data related to an image are coefficient data obtained by performing frequency analysis in image data.

3. The image processing apparatus as claimed in claim 2, wherein a two-dimensional discrete wavelet transform is performed as the frequency analysis on the image data in accordance with JPEG 2000, wavelet coefficients obtained by the transform are divided into bit-planes, and an arithmetic coding process is performed on data of each of the hit-planes, and wherein the multi-layer generation part divides the codes of coding paths obtained by the coding process into a plurality of layers sequentially from the coding paths corresponding to higher bit-planes such that the code amount of each of the layers is a predetermined value or less.

4. The image processing apparatus as claimed in claim 1, further comprising:

a storing part that stores codes obtained by the coding process;

wherein the code generation part generates coded data by reading from the storing part the codes divided into the respective layers by the multi-layer generation part.

5. The image processing apparatus as claimed in claim 1, further comprising:

a setting part that sets the number of the layers from a top to be used in accordance with a specified code amount;

wherein the code generation part generates coded data structured only by the number of the layers set by the setting part.

6. The image processing apparatus as claimed in claim 1, further comprising:

a predetermined value setting part that sets a predetermined value for a code amount of each of the layers;

wherein the multi-layer generation part divides the codes obtained by the coding process into a plurality of layers sequentially from the codes corresponding to higher bit-planes such that the code amount of each of the layers is equal to or less than the predetermined value that is set by the predetermined value setting part.

7. An image processing apparatus that divides data related to an image into bit-planes and performs a coding process on data of each of the bit-planes, the image processing apparatus comprising:

a multi-layer generation part that divides codes obtained by the coding process into a plurality of layers sequentially from the codes corresponding to higher bit-planes such that an amount of the codes of each of the layers is equal to or less than a predetermined value; and a code generation part that generates coded data in units of the codes divided into the respective layers by the multi-layer generation part, wherein the image processing apparatus performs the coding process on data related to an image divided into a plurality of blocks, wherein the image processing apparatus further comprises a truncation table including truncation data that determine the codes to be discarded sequentially from he codes corresponding to lower bit-planes for each of the blocks, and the truncation data are arranged such that the amount of the codes to be discarded is increased or decreased with an increase in a table number and quality of a reproduced image is gradually degraded or improved, wherein, based on the truncation table. the multi-layer generation part specifies for a top layer the truncation data of a table number with which the quality of the reproduced image is maximized, and specifies for subsequent layers the truncation data of table numbers such that a difference between a code amount of one of the subsequent layers and a code amount after discarding based on the truncation data specified for a preceding layer is a predetermined value or less and the quality of the reproduced image is maximized, and wherein the code generation part specifies codes of each of the layers based on the truncation data of the table number specified by the multi-layer generation part, and generates coded data in units of the codes of each of the layers.

8. An image processing method that divides data related to an image into bit-planes and performs a coding process on data of each of the bit-planes, the image processing method comprising the steps of:

dividing codes obtained by the coding process using an image processing apparatus into a plurality of layers sequentially from the codes corresponding to higher bit-planes such that a code amount of each of the layers is equal to or less than a predetermined value; and generating coded data in units of the codes divided into the respective layers by the step of dividing codes and using the image processing apparatus, wherein, based on a truncation table including truncation data that determine the codes to be discarded sequentially from the codes corresponding to lower bit-planes for each of the block, the step of dividing codes specifies for a top layer the truncation data of a table number with which the quality of the reproduced image is maximized, and specifies for subsequent layers the truncation data of table numbers such that a difference between a code amount of one of the subsequent layers and a code amount after discarding based on the truncation data specified for a preceding layer is a predetermined value or less and the quality of the reproduced image is maximized.

9. The image processing method as claimed in claim 8, wherein the data related to an image are coefficient data obtained by performing frequency analysis on image data.

10. The image processing method as claimed in claim 9, wherein a two-dimensional discrete wavelet transform is performed as the frequency analysis on the image data in accordance with JPEG 2000, wavelet coefficients obtained by the transform are divided into bit-planes, and an arithmetic coding process is performed on data of each of the bit-planes, and wherein the step of dividing codes divides the codes of respective coding paths obtained by the coding process into a plurality of layers sequentially from the coding paths corresponding to higher bit-planes such that the code amount of each of the layers is a predetermined value or less.

11. The image processing method as claimed in claim 8, wherein the step of generating coded data generates coded data by reading, from a storing that stores codes obtained by the coding process, the codes divided into the respective layers by the step of dividing codes.

12. The image processing method as claimed in claim 8, further comprising the step of:

setting the number of the layers from a top to be used in accordance with a specified code amount;

wherein the step of generating coded data generates coded data structured only by the number of the layers set by the step of setting.

13. The image processing method as claimed in claim 8, further comprising the step of:

setting a predetermined value for a code amount of each of the layers;

wherein the step of dividing codes divides the codes obtained by the coding process into a plurality of layers sequentially from the codes corresponding to higher bit-planes such that the code amount of each of the layers is equal to or less than the predetermined value that is set by the step of setting.

14. An image processing method that divides data related to an image into bit-planes and performs a coding process on data of each of the bit-planes, the image processing method comprising the steps of:
dividing codes obtained by the coding process using an image processing apparatus into a plurality of layers sequentially from the codes corresponding to higher bit-planes such that a code amount of each of the layers is equal to or less than a predetermined value; and
generating coded data in units of the codes divided into the respective layers by the step of dividing codes using the image processing apparatus,
wherein the image processing method performs the coding process on data related to an image divided into a plurality of blocks, wherein, based on a truncation table including truncation data that determine the codes to be discarded sequentially from he codes corresponding to lower bit-planes for each of the blocks, the truncation data being arranged such that the amount of the codes to be discarded is increased or decreased with an increase in a table number and quality of a reproduced image is gradually degraded or improved, the step of dividing codes specifies for a top layer the truncation data of a table number with which the quality of he reproduced image is maximized, and specifies for subsequent layers the truncation data of table numbers such that a difference between a code amount of one of the subsequent layers and a code amount after discarding based on the truncation data specified for a preceding layer is a predetermined value or less and the quality of the reproduced image is maximized, and
wherein the step of generating coded data specifies codes of each of the layers based on the truncation data of the table number specified by the step of dividing codes, and generates coded data in units of the codes of each of the layers.

15. A computer readable medium tangibly embodying an image processing program executable by a computer to divide data related to an image into bit-planes and perform a coding process on data of each of the bit-planes, the image processing program causing the computer to function at least as:
a multi-layer generation part that divides codes obtained by the coding process into a plurality of layers sequentially from the codes corresponding to higher bit-planes such that a code amount of each of the layers is equal to or less than a predetermined value;
a code generation part that generates coded data in units of the codes divided into the respective layers by the multi-layer generation part; and
a truncation table including truncation data that specify the codes to be discarded sequentially from the codes corresponding to lower bit-planes for each of the blocks,
wherein based on the truncation table the multi-layer generation part specifies for a top layer the truncation data of a table number with which quality of a reproduced image is maximized and specifies for subsequent layers the truncation data of table numbers such that a difference between a code amount of one of the subsequent layers and a code amount after discarding based on the truncation data specified for a preceding layer is a predetermined value or less and the quality of the reproduced image is maximized.

16. The computer readable medium as claimed in claim 15, wherein the data related to an image are coefficient data obtained by performing frequency analysis on image data.

17. The computer readable medium as claimed in claim 16, wherein a two-dimensional discrete wavelet transform is performed as the frequency analysis on the image data in accordance with JPEG 2000, wavelet coefficients obtained by the transform are divided into bit-planes, and an arithmetic coding process is performed on data of each of the bit-planes, and
wherein the multi-layer generation part divides the codes of coding paths obtained by the coding process into a plurality of layers sequentially from the coding paths corresponding to higher bit-planes such that the code amount of each of the layers is a predetermined value or less.

18. The computer readable medium as claimed in claim 15. wherein the code generation part generates coded data by reading, from a storing part that stores codes obtained by the coding process, the codes divided into the respective layers by the multi-layer generation part.

19. The computer readable medium as claimed in claim 15, wherein the image processing program causes the computer to further function as:
a setting part that sets the number of the layers from a top to be used in accordance with a specified code amount;
wherein the code generation part generates coded data structured only by the number of the layers set by the setting part.

20. The computer readable medium as claimed in claim 15, wherein the image processing program causes the computer to further function as:
a predetermined value setting part that sets a predetermined value for a code amount of each of the layers;
wherein the multi-layer generation part divides the codes obtained by the coding process into a plurality of layers sequentially from the codes corresponding to higher bit-planes such that the code amount of each of the layers is equal to or less than the predetermined value that is set by the predetermined value setting part.

21. A computer readable medium tangibly embodying an image processing program executable by a computer to divide data related to an image into bit-planes and perform a coding process on data of each of the bit-planes, the image processing program causing the computer to function at least as:
a multi-layer generation part that divides codes obtained by the coding process into a plurality of layers sequentially from the codes corresponding to higher bit-planes such that a code amount of each of the layers is equal to or less than a predetermined value; and
a code generation part that generates coded data in units of the codes divided into the respective layers by the multi-layer generation part,
wherein the multi-layer generation part performs the coding process on data related to an image divided into a plurality of blocks,
wherein, based on a truncation table including truncation data that determine the codes to be discarded sequentially from the codes corresponding to lower bit-planes for each of the blocks, the truncation data being arranged such that the amount of the codes to be discarded is increased or decreased with an increase in a table number and quality of a reproduced image is gradually degraded or improved, the multi-layer generation part specifies for a top layer truncation data of a table number with which the quality of the reproduced image is maximized, and specifies for subsequent layers truncation data of table numbers such that a difference between a code amount of one of the subsequent layers and a code amount after discarding based on the truncation data specified for a preceding layer is a predetermined value or less and the quality of the reproduced image is maximized, and wherein the code generation part specifies codes of each of the layers based on the truncation data of the table number specified by the multi-layer generation part, and generates coded data in units of the codes of each of the layers.

* * * * *